United States Patent
Sadig et al.

(10) Patent No.: US 9,683,909 B2
(45) Date of Patent: Jun. 20, 2017

(54) PRESSURE-MEASURING DEVICE FOR MEASURING DYNAMIC PRESSURE AND GAS-TURBINE COMBUSTION CHAMBER HAVING PRESSURE MEASURING DEVICE

(71) Applicants: Rolls-Royce Deutschland Ltd & Co KG, Blankenfelde-Mahlow (DE); Rolls-Royce plc, London (GB)

(72) Inventors: Sermed Sadig, Berlin (DE); Jochen Rupp, Staffordshire (GB)

(73) Assignees: Rolls-Royce Deutschland Ltd & Co KG, Blankenfelde-Mahlow (DE); Rolls-Royce PLC, London (GB)

( * ) Notice: Subject to any disclaimer, the term of this patent is extended or adjusted under 35 U.S.C. 154(b) by 78 days.

(21) Appl. No.: 14/665,792

(22) Filed: Mar. 23, 2015

(65) Prior Publication Data
US 2015/0268120 A1 Sep. 24, 2015

(30) Foreign Application Priority Data
Mar. 24, 2014 (DE) .................... 10 2014 205 459

(51) Int. Cl.
G01L 7/00 (2006.01)
G01L 19/06 (2006.01)
G01M 15/14 (2006.01)

(52) U.S. Cl.
CPC ......... G01L 19/0609 (2013.01); G01M 15/14 (2013.01)

(58) Field of Classification Search
None
See application file for complete search history.

(56) References Cited

U.S. PATENT DOCUMENTS

| 5,128,537 A | * | 7/1992 | Halg | G01L 9/0079 |
| | | | | 250/231.19 |
| 5,284,060 A | * | 2/1994 | Martinez | G01L 7/086 |
| | | | | 73/707 |
| 5,419,182 A | * | 5/1995 | Koshimizu | G01L 19/0038 |
| | | | | 73/46 |

(Continued)

FOREIGN PATENT DOCUMENTS

| DE | 2949570 | 6/1980 |
| EP | 0897106 | 2/1999 |

(Continued)

OTHER PUBLICATIONS

European Office Action dated Sep. 29, 2016 from EP counterpart App No. 15158438.0.

(Continued)

*Primary Examiner* — Andre Allen
(74) *Attorney, Agent, or Firm* — Shuttleworth & Ingersoll, PLC; Timothy Klima

(57) ABSTRACT

The present invention relates to a pressure-measuring device for measuring dynamic pressures in the high-temperature range, with a pressure line connected to a volume subjected to pressure and with a pressure sensor which is arranged at a distance from the inlet area of the pressure line to the volume, wherein the pressure line is provided with at least one pinhole diaphragm and connected to an additional damping volume, as well as to the use of the pressure-measuring device in a combustion chamber of a gas turbine.

20 Claims, 8 Drawing Sheets

(56) References Cited

U.S. PATENT DOCUMENTS

Figure 1:
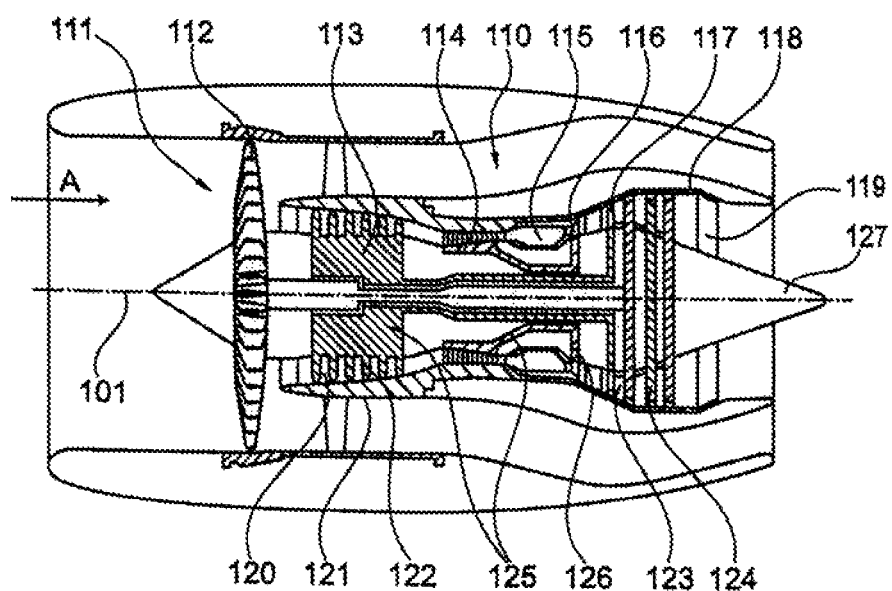

| | | | | |
|---|---|---|---|---|
| 5,495,826 | A | * | 3/1996 | Lindbloom ............. A01K 7/06 |
| | | | | 119/75 |
| 6,053,048 | A | * | 4/2000 | Keller ................... F01D 21/003 |
| | | | | 73/707 |
| 2003/0024318 | A1 | * | 2/2003 | Brehm ................. F01D 21/003 |
| | | | | 73/702 |
| 2004/0134284 | A1 | | 7/2004 | Gleeson et al. |
| 2005/0044958 | A1 | | 3/2005 | Chowdhury |
| 2008/0276712 | A1 | | 11/2008 | Kurtz et al. |
| 2010/0175482 | A1 | * | 7/2010 | Kurtz ................. G01L 19/0609 |
| | | | | 73/727 |
| 2010/0275675 | A1 | * | 11/2010 | Seppa ................... G01L 9/0041 |
| | | | | 73/24.01 |
| 2012/0011936 | A1 | * | 1/2012 | Hurst ................. G01L 19/0609 |
| | | | | 73/702 |

FOREIGN PATENT DOCUMENTS

| | | |
|---|---|---|
| GB | 2037993 | 7/1980 |
| JP | H06-331146 | 11/1994 |

OTHER PUBLICATIONS

German Search Report dated Feb. 6, 2015 for counterpart App. No. 10 2014 205 459.1.

European Search Report dated Aug. 20, 2015 from EP counterpart App No. 15158438.0.

\* cited by examiner

PRESSURE-MEASURING DEVICE FOR MEASURING DYNAMIC PRESSURE AND GAS-TURBINE COMBUSTION CHAMBER HAVING PRESSURE MEASURING DEVICE

This application claims priority to German Patent Application 102014205459.1 filed Mar. 24, 2014, the entirety of which is incorporated by reference herein.

This invention relates to the measurement of pressure fluctuations, in particular of pressure fluctuations in a combustion chamber of a gas turbine. The invention in particular relates to a P30 pressure line arranged on an outer combustion chamber casing.

It is known from the state of the art to measure stationary pressures in a combustion chamber of a gas turbine, in particular an aircraft gas turbine, using a so-called P30 pressure line. This pressure line is designed according to the state of the art as a flexible tube and consists of individual elements which are plugged together or otherwise connected. As a result, cross-sectional changes occur between the individual elements and can impair the transient pressure measurement. An arrangement of this type is shown in U.S. Pat. No. 6,053,048 A.

In a previously known pressure line, it is known to provide the latter at one point with a pressure transmitter that measures the pressure in the pressure line and passes it on to an engine control unit (EEC). On its other side, the pressure line, which penetrates an outer combustion chamber casing, is connected to a combustion chamber annulus. At this connection point to the combustion chamber annulus the P30 pressure is tapped.

Due to the high thermal loading close to the combustion chamber casing, the pressure line is, in accordance with the state of the art, routed over several meters into a cold zone close to the engine control unit. The pressure sensor is placed there. The entire system known from the state of the art is designed to measure stationary pressures.

A further disadvantage of the previously known designs is that additional cross-sectional changes or cross-sectional variations are provided in the pressure line, to form water traps; these protect the pressure sensor from an accumulation of water.

Pressure-measuring structures are furthermore known from the state of the art, by means of which transient pressures can be measured in a combustion chamber of a gas turbine. Here, a pressure tube is routed as a rule from the combustion chamber wand through the combustion chamber casing to a pressure sensor. The latter can either be positioned as close as possible to the combustion chamber casing, which however requires expensive high-temperature sensors, or alternatively the sensors can be attached orthogonally to the pressure tube, while said pressure tube prevents reflexions occurring in the pressure line by a so-called semi-infinite tube. Semi-infinite tubes of this type have considerable lengths, for example between 10 m and 50 m. A system of this type is known from US 2003/0024318 A1.

In an alternative embodiment it is also possible to measure transient P30 pressures directly on the engine casing. Due to the high thermal loading this is however only possible using expensive high-temperature pressure sensors.

The arrangements known from the state of the art are mostly suitable only for measuring the stationary combustion chamber pressure, not however for transient pressure measurements. It is also disadvantageous here that in the relatively long pressure lines acoustic reflexions occur which interfere with the measuring signal and hence prevent acoustic measurement for frequencies between 50 Hz and 4000 Hz. The embodiment known from US 2003/0024318 A1 results, as already mentioned, in a very long pressure line, representing additional weight and increasing the overall costs. An additional problem is that the large number of fuel lines and engine instrumentation lines often means that insufficient space is available for installation of a pressure line several tens of meters long.

The object underlying the present invention is to provide a pressure-measuring device and a gas-turbine having a pressure-measuring device of this type, which while being simply designed and easily and cost-effectively producible permits an interference-free pressure-measurement and in particular requires only a small size.

It is a particular object of the present invention to provide solution to the above problematics by the combination of the features of the independent Claims. Further advantageous embodiments of the invention become apparent from the sub-claims.

It is thus provided in accordance with the invention that a pressure line is connected to a volume subjected to pressure. The pressure line is furthermore connected to a pressure sensor which is arranged at a distance from the inlet area of the pressure line. It is provided here in accordance with the invention that the pressure line has at least one pinhole diaphragm and is connected on its side opposite the volume subjected to pressure to an additional volume.

With regard to the gas turbine, it is provided that the pressure-measuring device is intended for pressure measurement inside a combustion chamber of the gas turbine, and for that purpose the pressure line is connected to an annulus of the combustion chamber.

The invention is characterized by a variety of considerable advantages.

With the measuring structure in accordance with the invention, it is possible to measure dynamic pressure fluctuations in a combustion chamber. Unwelcome oscillations in the measuring structure are damped by the pinhole diaphragm provided in accordance with the invention. In particular, acoustic waves are damped by the diaphragm. This makes possible a large measurement range which is not impaired by the acoustic errors known from the state of the art. The additionally provided volume, which can also be referred to as the damping volume, results in the possibility of measuring dynamic pressures over a sufficiently long pressure line. The pressure line can be dimensioned here such that the pressure sensor can be arranged at a sufficient distance from the combustion chamber to protect the latter from thermal effects. This makes it possible to use an inexpensive pressure sensor. A low-reflexion semi-infinite pressure line, as is known from the state of the art, can be dispensed with in accordance with the invention. Instead, an already existing P30 pressure line can be suitably modified in accordance with the present invention and at the same time used for dynamic pressure measurement.

It is possible in accordance with the invention to provide, downstream of the diaphragm, structural measures to collect and drain off water in the pressure line without the acoustic behaviour of the dynamic pressure-measuring device in accordance with the invention being altered as a result.

The simple design possible in accordance with the invention creates the option of performing dynamic pressure measurements of combustion chamber pressure oscillations that were avoided in the state of the art for cost and weight reasons. It is thus possible to collect important data for the service life calculation or the service life estimate of the combustion chamber. This is important in particular for lean-burn systems, since in these systems higher pressure oscillations occur than in rich-burn systems.

Generally speaking, the invention is not restricted to use in gas turbines, in particular aircraft gas turbines; instead the pressure-measuring device in accordance with the invention can be employed for measuring dynamic pressures in the high-temperature range also for other applications.

The present invention is described in the following in light of the accompanying drawing showing exemplary embodiments. In the drawing, FIG. 1 shows a gas-turbine engine where the gas-turbine combustion chamber in accordance with the present invention can be used, FIG. 2 shows a schematic side view of a combustion chamber known from the state of the art, and FIGS. 3 to 8 show preferred exemplary embodiments of the pressure-measuring device in accordance with the present invention in a schematic side view.

Figure 2:
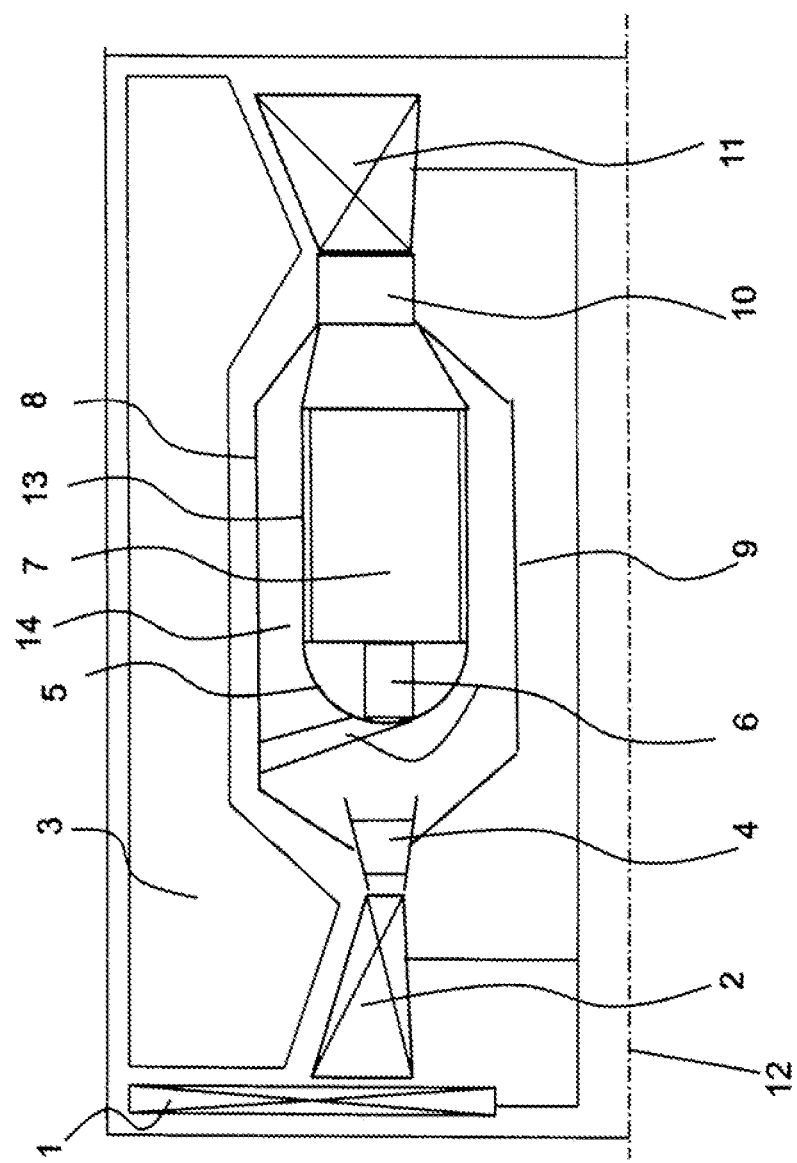

The gas-turbine engine 110 in accordance with FIG. 1 is a generally represented example of a turbomachine where the invention can be used. The engine 110 is of conventional design and includes in the flow direction, one behind the other, an air inlet 111, a fan 112 rotating inside a casing, an intermediate-pressure compressor 113, a high-pressure compressor 114, a combustion chamber 115, a high-pressure turbine 116, an intermediate-pressure turbine 117 and a low-pressure turbine 118 as well as an exhaust nozzle 119, all of which being arranged about a center engine axis 101.

The intermediate-pressure compressor 113 and the high-pressure compressor 114 each include several stages, of which each has an arrangement extending in the circumferential direction of fixed and stationary guide vanes 120, generally referred to as stator vanes and projecting radially inwards from the engine casing 121 in an annular flow duct through the compressors 113, 114. The compressors furthermore have an arrangement of compressor rotor blades 122 which project radially outwards from a rotatable drum or disk 125 linked to hubs 126 of the high-pressure turbine 116 or the intermediate-pressure turbine 117, respectively.

The turbine sections 116, 117, 118 have similar stages, including an arrangement of fixed stator vanes 123 projecting radially inwards from the casing 121 into the annular flow duct through the turbines 116, 117, 118, and a subsequent arrangement of turbine blades 124 projecting outwards from a rotatable hub 126. The compressor drum or compressor disk 125 and the blades 122 arranged thereon, as well as the turbine rotor hub 126 and the turbine rotor blades 124 arranged thereon rotate about the engine center axis 101 during operation.

FIG. 2 shows in a simplified representation part of an annular combustion chamber 7 in accordance with the invention. This chamber includes a combustion chamber head 5 as well as a burner 6 with a burner arm and a chamber head. Upstream of the burner, a compressor stator wheel 4, to which air is supplied from a compressor 2, is schematically shown. Reference numeral 1 shows a front fan (fan). The airflow exiting the front fan 1 is also passed through a bypass duct 3.

The combustion chamber 7 includes an outer combustion chamber casing 8 and an inner combustion chamber casing 9. A turbine stator wheel 10 is arranged at the outlet area of the combustion chamber 7 and is followed by a turbine 11. Reference numeral 12 identifies a drive shaft/engine center axis.

The combustion chamber 7 furthermore has a combustion chamber wall 13 which forms with the outer combustion chamber casing 8 a combustion chamber annulus 14, as is shown in FIG. 2.

FIGS. 3 to 8 each show, in a simplified representation, design variants of the pressure-measuring device in accordance with the invention. For measurement of dynamic pressure fluctuations in the combustion chamber 7 using said device, the pressure from the combustion chamber annulus 14, which has an acoustic connection to the combustion chamber via perforations in the combustion chamber wall 13 and also via the burner 6, is tapped using a static pressure line 23 on the combustion chamber casing 8.

In accordance with the invention, a pressure sensor 20 is provided which is at a distance 21 from the connection area of the pressure line 23 to the outer combustion chamber casing 8.

In the exemplary embodiments of FIGS. 3 to 7, the pressure sensor 20 is kept at a distance from the pressure line 23 by means of a separate connecting line 19 and connected to said pressure line. Alternatively, the pressure sensor 20 can however also be connected flush and directly to the pressure line 23 without a separate connecting line 19.

Figure 3:
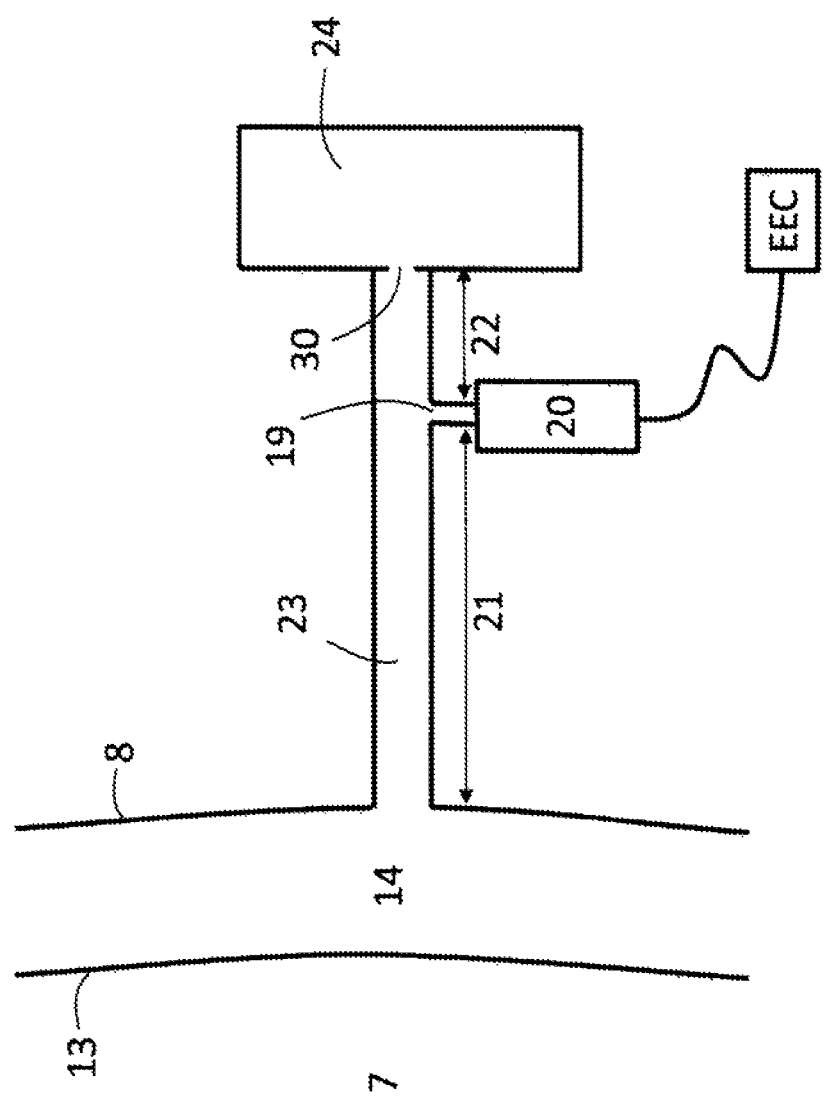

In the exemplary embodiment shown in FIG. 3, the pressure line 23 is extended past the connection area of the connecting line 19 and has a diaphragm 30 via which the interior of the pressure line 23 is connected to a damping volume 24. The distance from the connection area of the connecting line 19 to the diaphragm 30 is identified by the reference numeral 22.

The pressure sensor 20 is, as in the exemplary embodiments described in the following, connected in each case to an engine control unit EEC.

In the exemplary embodiment shown in FIG. 3, the damping volume 24 is opened to the pressure line 23 only by the diaphragm 30. There is no flow through the pressure line 23, but it absorbs the dynamic pressure fluctuations. Overall, a Helmholtz resonator is obtained due to the diaphragm 30.

In the exemplary embodiments described in the following, identical parts are each provided with the same reference numerals, so that a repeated description can be dispensed with.

Figure 4:
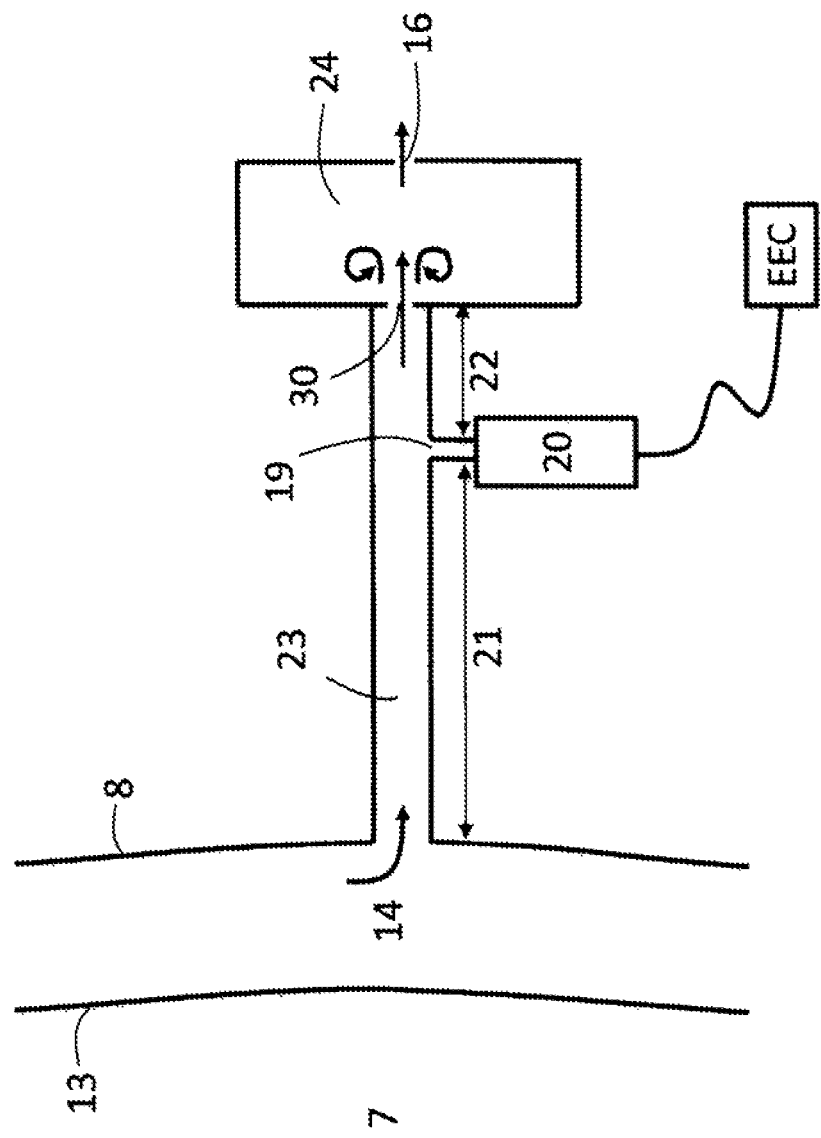

The exemplary embodiment of FIG. 4 differs from the exemplary embodiment of FIG. 3 in that the volume 24 is provided with an outlet opening 16 through which a flow passing through the pressure line 23 can exit, as is indicated by the flow arrows. In the exemplary embodiment shown in FIG. 4, the outlet opening 16 of the volume 24 generates a further pressure gradient over the pressure line 23. The ratio of the cross-sectional area of the diaphragm 30 to the cross-sectional area of the volume 24 is preferably selected here such that the ratio corresponds to a factor of 0.1 to 10 times the Mach number in the diaphragm 30.

Figure 5:
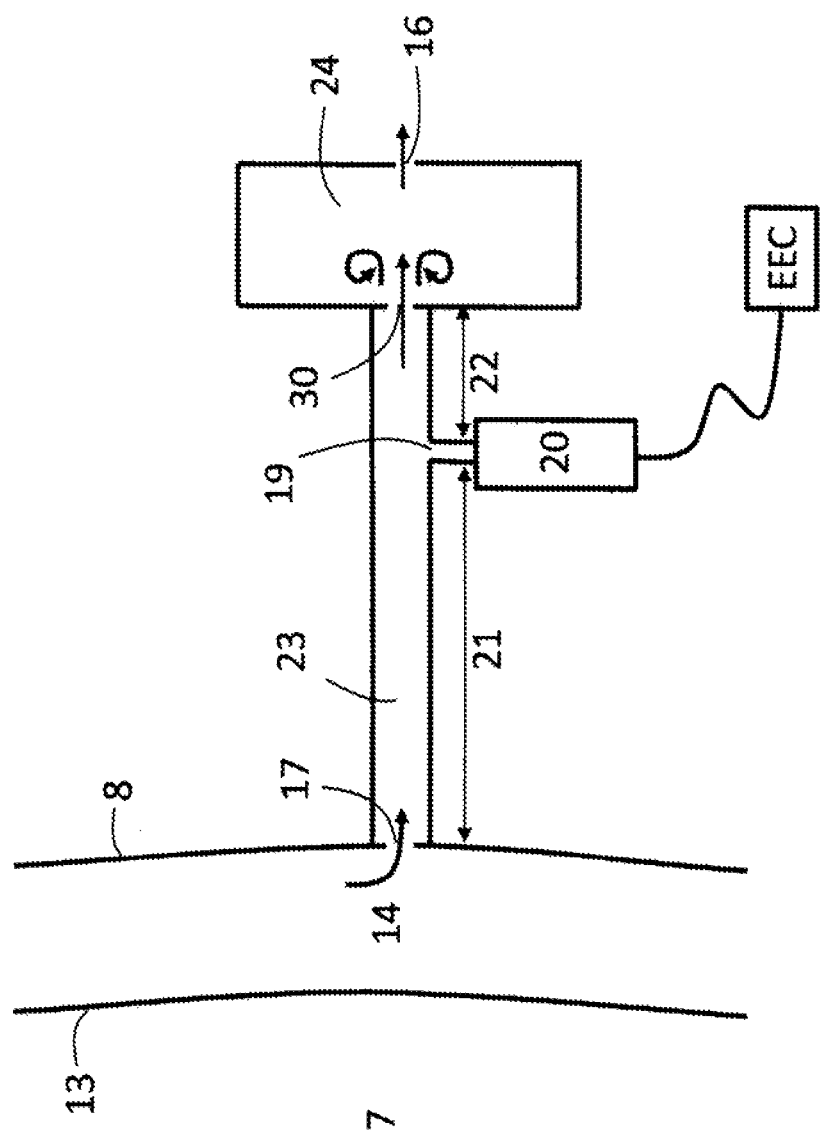

In the exemplary embodiment of FIG. 5, an additional diaphragm 17 is arranged at the inlet area of the pressure line 23. Otherwise, the exemplary embodiment of FIG. 5 corresponds to the exemplary embodiment shown in FIG. 4. The exemplary embodiment shown in FIG. 5 can also be designed without the diaphragm 30. The diaphragm necessary in accordance with the invention is formed here by the diaphragm 17.

Figure 6:
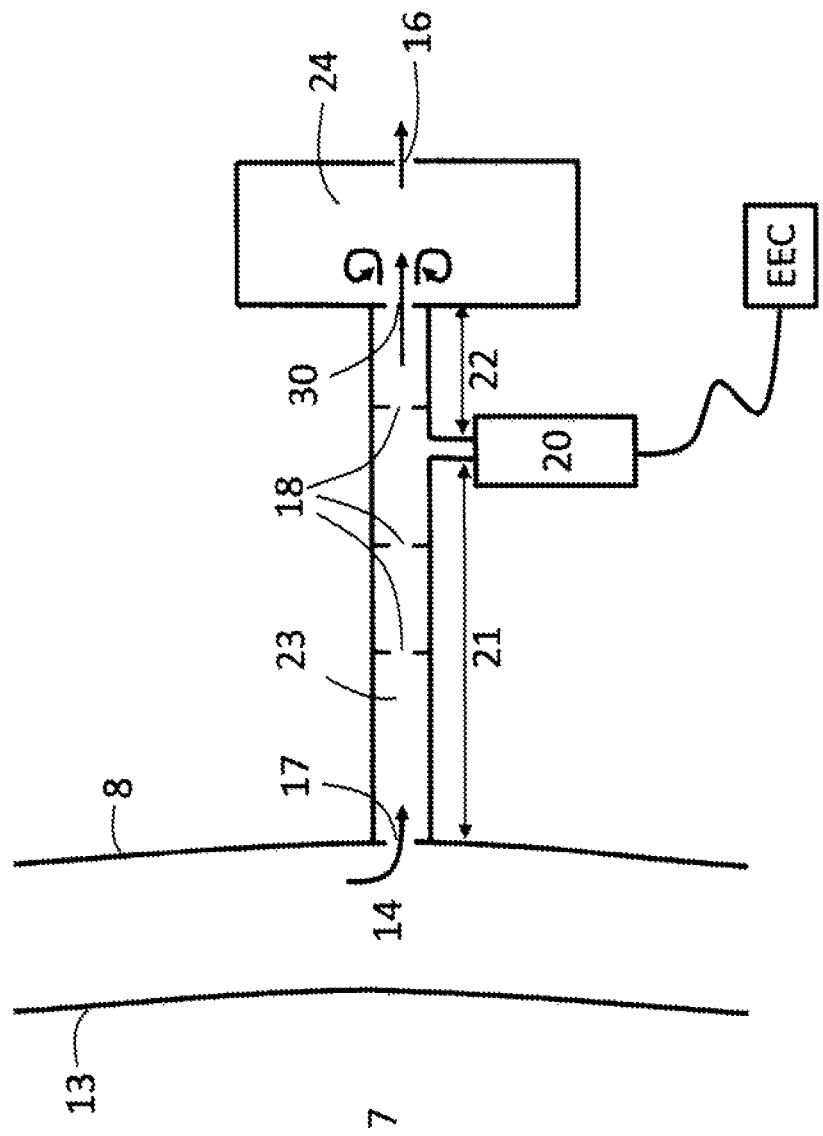

FIG. 6 shows a further variant in which, in a development of the exemplary embodiment in FIG. 5, further diaphragms 18 are arranged in the pressure line 23. FIG. 6 shows several diaphragms 18, and it is understood that only one diaphragm 18 of this type can be used. Furthermore, it is also possible to dispense with the diaphragms 17 and 30.

Figure 7:
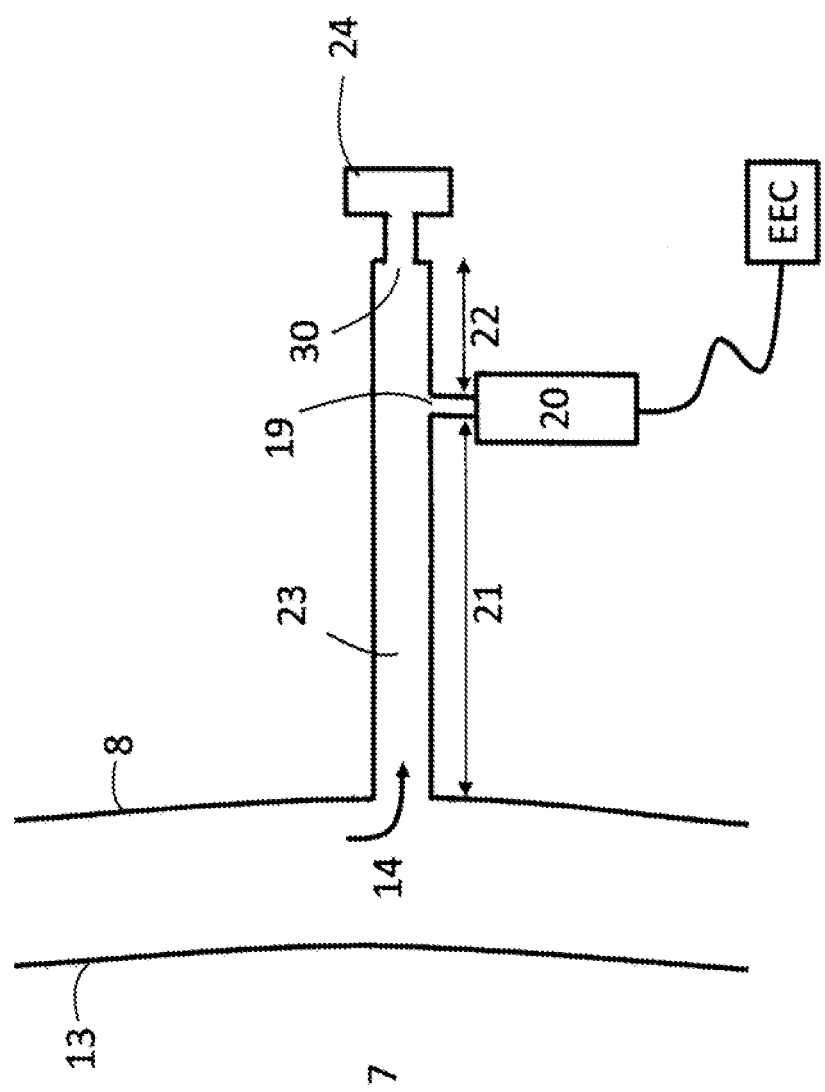

FIG. 7 shows an exemplary embodiment by analogy with FIG. 3. However, in the exemplary embodiment shown in FIG. 7, the diaphragm 30 is designed longer, so that the volume 24 can be designed smaller. The diaphragm 30 thus has, as described, a greater length. The length of the diaphragm 30 plus its diameter and volume 24 can be calculated as follows:

$$V = \left(\frac{d_0}{2\pi f}\right)^2 \frac{S_0}{l_{\mathit{eff}}}.$$

where "$a_o$" is the sound velocity, "f" the resonance frequency, "$S_o$" the cross-sectional area of the diaphragm 30 and "$l_{\mathit{eff}}$" the length of the diaphragm 30.

Figure 8:
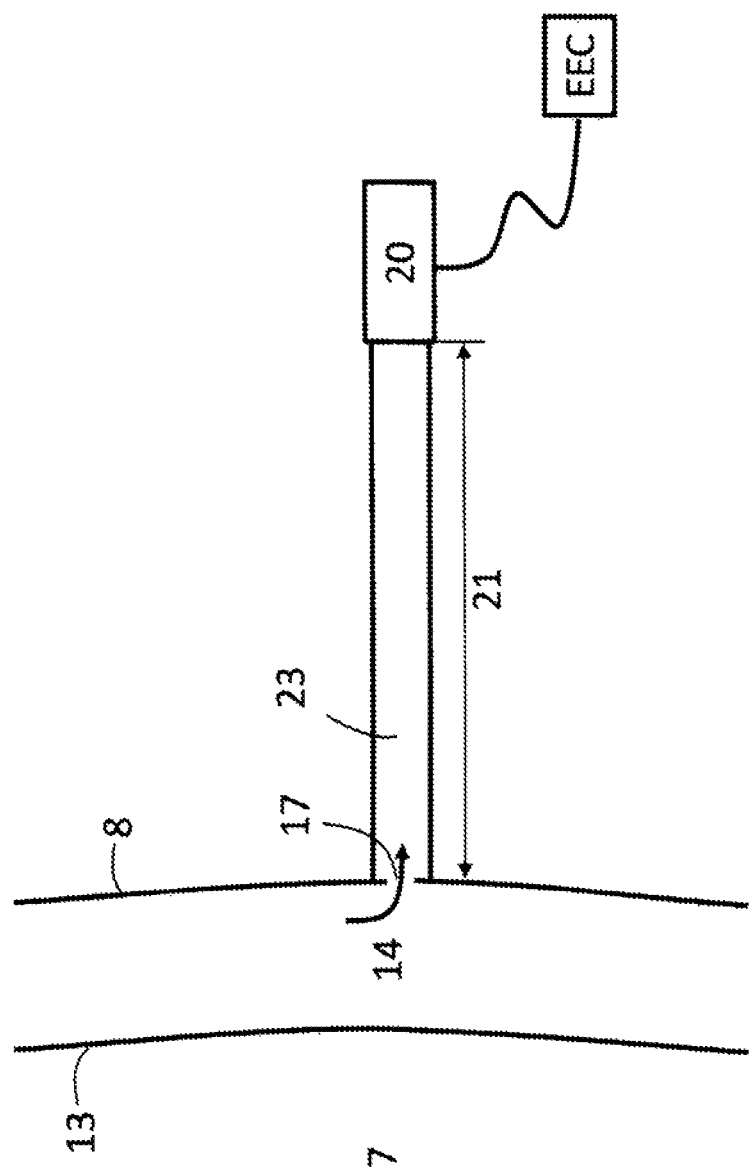

FIG. 8 shows a design variant in which the pressure sensor 20 is arranged directly at the end area of the pressure line 23. A diaphragm 17 is provided at the inlet area of the pressure line 23.

The diaphragm 30 can, in accordance with the invention, be designed as a perforated plate. The distance 21 from the pressure sensor 20 to the outer combustion chamber casing 8 can be between 10 mm and 10 m. The distance 22 from the pressure sensor 20 to the diaphragm 30 can also be between 10 mm and 10 m.

It is particularly favourable when the cross-sectional area of the pressure line 23 does not have any large diameter changes, in particular no diameter changes greater than the diameter of the pressure line 23.

The outlet opening 16 from the volume 24 can optionally be opened to the environment or connected to the engine for returning the tapped air to the engine.

LIST OF REFERENCE NUMERALS

1 Front fan (fan)
2 Compressor
3 Bypass duct
4 Compressor stator wheel
5 Combustion chamber head
6 Burner with arm and head
7 Combustion chamber
8 Outer combustion chamber casing
9 Inner combustion chamber casing
10 Turbine stator wheel
11 Turbine
12 Drive shaft/engine center axis
13 Combustion chamber wall
14 Combustion chamber annulus
16 Outlet opening from volume 24
17 Diaphragm directed towards the combustion chamber annulus 14
18 Diaphragm in pressure line 23
19 Connecting line from pressure sensor 20 to pressure line 23
20 Pressure sensor
21 Distance from pressure sensor 20 to the outer combustion chamber casing 8
22 Distance from pressure sensor 20 to the diaphragm 30
23 Pressure line
24 Damping volume downstream of diaphragm 30
30 Diaphragm to damping volume 24
101 Engine center axis
110 Gas-turbine engine/core engine
111 Air inlet
112 Fan
113 Intermediate-pressure compressor (compressor)
114 High-pressure compressor
115 Combustion chamber
116 High-pressure turbine
117 Intermediate-pressure turbine
118 Low-pressure turbine
119 Exhaust nozzle
120 Guide vanes
121 Engine casing
122 Compressor rotor blades
123 Stator vanes
124 Turbine blades
125 Compressor drum or disk
126 Turbine rotor hub
127 Exhaust cone

What is claimed is:

1. A pressure-measuring device for measuring dynamic pressures in a high-temperature range, comprising:
a pressure line connected to a volume subjected to pressure, and
a pressure sensor arranged at a distance from an inlet area of the pressure line to the volume,
an additional damping volume, wherein the pressure line includes at least one pinhole diaphragm and is connected to the additional damping volume.

2. The device in accordance with claim 1, wherein the additional damping volume is arranged at an end of the pressure line.

3. The device in accordance with claim 1, wherein the additional damping volume is closed to prevent fluid flow through the pressure line and additional damping volume.

4. The device in accordance with claim 1, and further comprising a connecting line connecting the pressure sensor to the pressure line.

5. The device in accordance with claim 1, and further comprising at least one further diaphragm arranged in the pressure line.

6. The device in accordance with claim 1, wherein the pressure line is open to permit fluid flow through the pressure line.

7. A combustion chamber of a gas turbine, comprising the pressure-measuring device in accordance with claim 1 for dynamic pressure measurement in the combustion chamber of the gas turbine.

8. The combustion chamber of the gas turbine in accordance with claim 7, wherein the pressure line is connected to an annulus of the combustion chamber.

9. The combustion chamber of the gas turbine in accordance with claim 7, wherein the pressure sensor is operatively connected to an electronic engine control unit.

10. The combustion chamber of the gas turbine in accordance with claim 7, and further comprising at least one chosen from wherein the pressure sensor is a dynamic pressure sensor and wherein the pressure line is a static pressure line.

11. The device in accordance with claim 1, wherein the additional damping volume includes an outlet opening to permit fluid flow through the pressure line and additional volume.

12. The device in accordance with claim 2, wherein the additional damping volume includes an outlet opening to permit fluid flow through the pressure line and additional volume.

13. The device in accordance with claim 2, and further comprising a connecting line connecting the pressure sensor to the pressure line.

14. The device in accordance with claim 3, and further comprising a connecting line connecting the pressure sensor to the pressure line.

15. The device in accordance with claim 2, and further comprising at least one further diaphragm arranged in the pressure line.

16. The device in accordance with claim 3, and further comprising at least one further diaphragm arranged in the pressure line.

17. The device in accordance with claim 4, and further comprising at least one further diaphragm arranged in the pressure line.

18. The device in accordance with claim 2, wherein the pressure line is open to permit fluid flow through the pressure line.

19. The device in accordance with claim 4, wherein the pressure line is open to permit fluid flow through the pressure line.

20. The device in accordance with claim 5, wherein the pressure line is open to permit fluid flow through the pressure line.

* * * * *